United States Patent [19]

Johnson

[11] Patent Number: 5,032,790
[45] Date of Patent: Jul. 16, 1991

[54] PASSIVE MAGNETIC SPEED SENSOR

[75] Inventor: James B. Johnson, Gregory, Mich.

[73] Assignee: Kelsey-Hayes Company, Romulus, Mich.

[21] Appl. No.: 395,833

[22] Filed: Aug. 18, 1989

Related U.S. Application Data

[63] Continuation of Ser. No. 56,574, Jun. 1, 1987, abandoned, which is a continuation-in-part of Ser. No. 874,112, Feb. 28, 1986, abandoned.

[51] Int. Cl.$^5$ .............................................. G01P 3/44
[52] U.S. Cl. ................................. 324/174; 324/207.16; 324/207.22; 324/207.25
[58] Field of Search ............... 324/167, 173, 174, 262, 324/207.14–207.16, 207.22, 207.23, 207.25; 310/168; 340/670, 671; 74/462

[56] References Cited

U.S. PATENT DOCUMENTS

| | | | |
|---|---|---|---|
| 3,719,841 | 3/1973 | Ritsema | 324/174 X |
| 3,942,045 | 3/1976 | Palazzetti | 324/174 X |
| 4,196,390 | 4/1980 | Pitkin | 324/173 X |
| 4,611,168 | 9/1986 | Kudelski et al. | 324/174 |
| 4,652,818 | 3/1987 | Buschmid et al. | 324/174 |

FOREIGN PATENT DOCUMENTS 58-42740 9/1984 Japan .

Primary Examiner—Kenneth Wieder
Assistant Examiner—Jack B. Harvey
Attorney, Agent, or Firm—MacMillan, Sobanski & Todd

[57] ABSTRACT

A magnetic speed sensor is provided with a uniquely-shaped pole piece and is utilized in conjunction with a uniquely-shaped exciter ring. The sensor includes a magnet which is positioned at one end of the pole piece. In accordance with the present invention, the pole piece is provided with three sections, each of which are shaped and have a cross-sectional configuration designed to optimize the output of the speed sensor. In particular, the pole piece includes an inner end portion, and intermediate portion, and an outer end portion. The inner end portion of the pole member, which is positioned adjacent one end of the magnet, has a cross-sectional configuration generally corresponding to the cross-sectional configuration of the one end of the magnet. The intermediate portion of the pole piece has a cross-sectional configuration generally corresponding to the cross-sectional configuration of an aperture in an insulating bobbin which coaxially supports a coil around the pole piece. Finally, the outer end of the pole piece is designed with a rectangular cross-sectional configuration which is sized in accordance with the shape of the exciter ring teeth. The exciter ring is provided with a plurality of circumferentially spaced teeth members having an outer tip portion with a semi-cylindrical configuration.

17 Claims, 2 Drawing Sheets

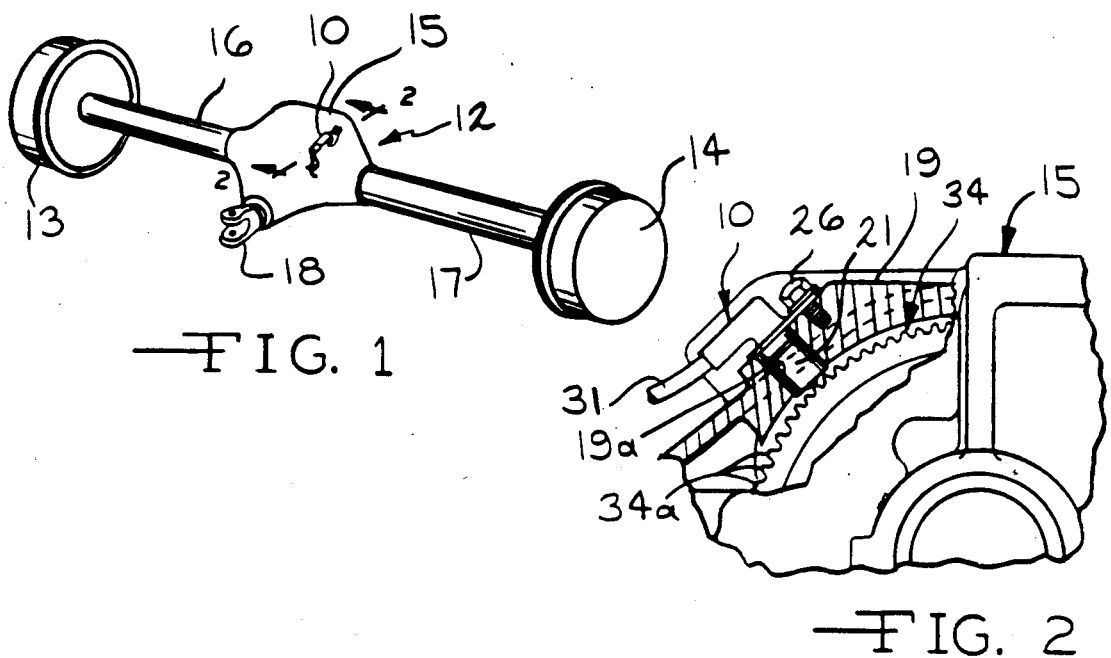
FIG. 1
FIG. 2
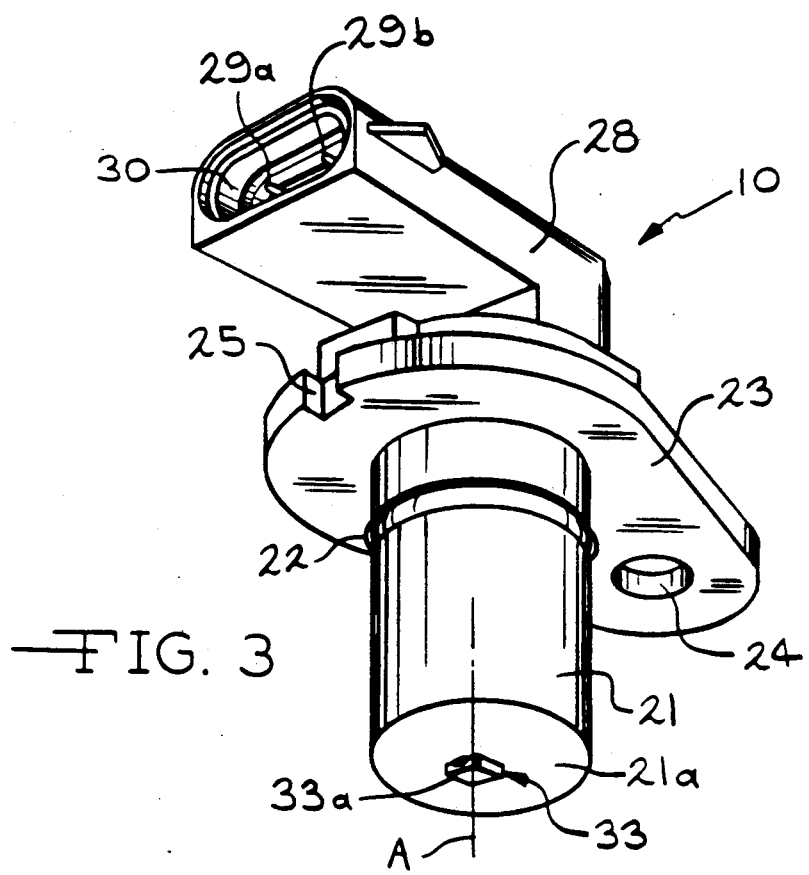
FIG. 3

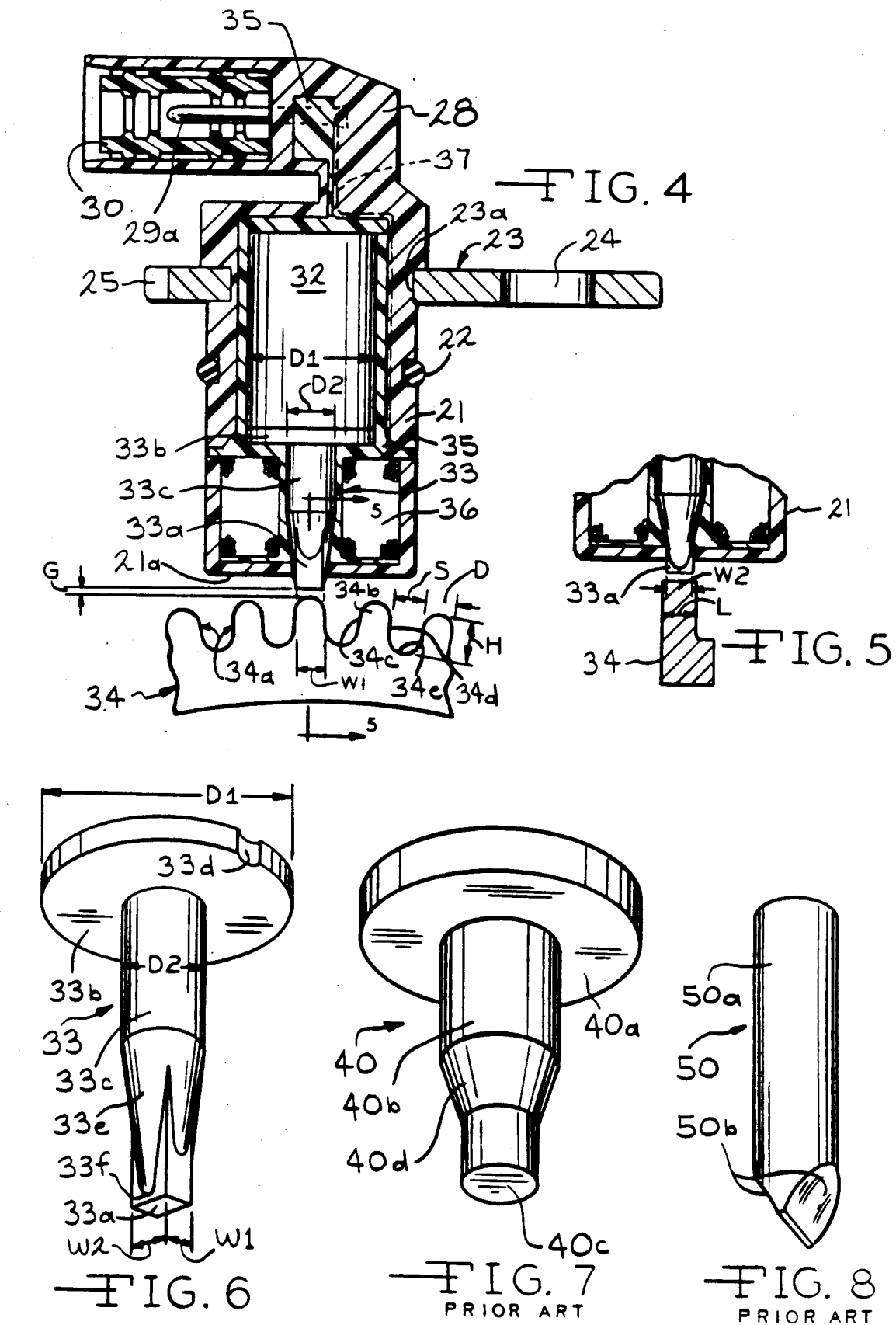

PASSIVE MAGNETIC SPEED SENSOR

CROSS-REFERENCE TO RELATED APPLICATIONS

This is a continuation of application Ser. No. 56,574, filed June 1, 1987 which is a continuation in part of Ser. No. 874,112, filed Feb. 28, 1986, both now abandoned.

BACKGROUND OF THE INVENTION

The present invention relates generally to a variable reluctance magnetic transducer and, in particular, to a passive-type magnetic transducer especially suited for sensing the speed of a rotating object.

Passive-type variable reluctance magnetic transducers are well known and have been widely used as speed sensors in electric control circuits for monitoring the speed of an associated rotating object such as, for example, a gear. Typically, the transducer includes an outer housing which contains a permanent magnet, a pole piece constructed of a ferrous material and having one end positioned adjacent the magnet, and a coil surrounding the pole piece for sensing changes in magnetic flux through the coil. The opposite end of the pole extends outwardly from the housing and is adapted to be spaced from a projecting ferrous element which is attached to and rotates with the rotating object. For example, the projecting ferrous element or elements can be the teeth of a rotating gear. The coil is connected to generate an output signal to an associated electronic control circuit. An example of a prior art passive-type magnetic speed sensor can be found in U.S. Pat. No. 3,890,517.

In operation, a magnetic field extends from the magnet through the pole piece and out into the air space at the end of the pole piece. The return path of the magnetic field is from the air space to the other end of the magnet. As a ferrous element approaches the tip of the pole piece, the reluctance of the magnetic circuit decreases, thus increasing the magnetic field. As the ferrous object passes away from the pole piece, the magnetic field decreases. When the magnetic field decreases, it induces a voltage in the coil in one direction and, when it increases, it induces a voltage in the coil in the opposite direction. The passage of one ferrous object (such as one gear tooth) induces one cycle of AC voltage. The AC voltage is proportional to the rate of change of magnetic flux in the magnetic circuit, and is generally proportional to the speed of the ferrous objects passing the pole piece, at least up to a predetermined speed. The frequency of the AC signal is directly proportional to the number of ferrous objects passing the pole piece per unit of time.

The output voltage of the speed sensor is typically an important design criteria, i.e., the speed sensor must generate a sufficient output voltage at the lowest speed of interest. The output voltage of the speed sensor depends on a wide variety of factors, some of which include the surface speed of the gear teeth passing the pole piece, the gap between the pole piece and the gear teeth, the size and shape of the gear teeth, the spacing between the gear teeth, the load impedance connected to the speed sensor, and the particular configuration of the pole piece.

Generally, in order to obtain the highest output from the speed sensor, the pole piece should be located as close to the gear as the particular application will permit. The output voltage of the speed sensor is significantly affected by changes in the air gap and is almost inversely proportional to the square of the air gap.

Changes in the configuration of the pole piece can also affect the speed sensor output voltage. Generally, when sensing a rotating gear, sensors are provided with a cylindrical projecting portion having a diameter which is less than or equal to the width of the top surface of the associated gear tooth. However, when using a gear of finer than optimum pitch, it has been found desirable to use a pole piece having an outer tip shaped to a chisel, and which is oriented perpendicular with the rotational axis of the gear.

SUMMARY OF THE INVENTION

The present invention relates to a variable reluctance passive-type magnetic transducer which is especially suited for use as a speed sensor. The speed sensor is provided with a uniquely shaped pole piece to increase the output of the sensor, thus allowing the sensor to accommodate a larger air gap between the pole piece and an associate rotating object. The present invention also concerns an exciter ring having uniquely-shaped teeth which, when used in combination with the speed sensor, results in an improved signal under low speed conditions.

The speed sensor includes a permanent magnet and an elongated pole piece which is positioned adjacent the magnet. In accordance with the present invention, the pole piece is provided with three sections, each of which are shaped and have a cross-sectional configuration designed to optimize the output of the speed sensor. In particular, the pole piece includes an inner end portion, an intermediate portion, and an outer end portion. An insulating bobbin surrounds the intermediate portion of the pole member and coaxially supports a coil for sensing changes in reluctance of the magnetic circuit. The insulating bobbin defines an aperture for receiving the intermediate portion of the pole member.

In accordance with the present invention, the inner end portion of the pole piece, which is positioned adjacent one end of the magnet, has a cross-sectional configuration generally corresponding to the cross-sectional configuration of the one end of the magnet. Further, the intermediate portion of the pole member has a cross-sectional configuration generally corresponding to the cross-sectional configuration of the aperture in the insulating bobbin. Finally, the outer end of the pole piece is provided with a rectangular-shaped cross-sectional configuration.

In the preferred embodiment of the invention, the inner end of the pole piece has a circular cross-section, and the intermediate portion has a circular cross-section of a diameter smaller than the diameter of the inner end. The intermediate portion and the rectangular outer end are connected by a conical section As stated above, an improved AC signal is achieved under low speed conditions when the speed sensor as described above is used in conjunction with a uniquely shaped exciter ring. The exciter ring is secured to the rotating object and is provided with a plurality of circumferentially spaced teeth members having an outer tip portion with a generally semi-cylindrical configuration. It has been found that the combination of the rectangular shaped pole piece end and an exciter ring having a semi-cylindrical shaped outer teeth provides an improved signal under low speed conditions.

The above, as well as other advantages of the present invention, will become readily apparent to one skilled in the art from reading the following detailed description of the invention in conjunction with the attached drawings.

BRIEF DESCRIPTION OF THE DRAWINGS

FIG. 1 is a perspective view of a vehicle axle assembly having a speed sensor according to the present invention mounted thereon for sensing the speed of the associated rotating wheels;

FIG. 2 is a fragmentary cross-sectional view taken along the line 2—2 of FIG. 1 and illustrating the relative positions between the speed sensor of the present invention and an exciter ring secured relative to a ring gear within the differential casing;

FIG. 3 is a perspective view of the speed sensor of the present invention;

FIG. 4 is a sectional view through the speed sensor along with a fragmentary elevational view of a sector of the exciter ring;

FIG. 5 is a sectional view taken along the line 5—5 of FIG. 3;

FIG. 6 is a perspective view of the pole piece utilized with the speed sensor shown in FIGS. 3 through 5;

FIG. 7 is a perspective view of a first prior art pole piece configuration; and

FIG. 8 is a perspective view of a second prior art pole piece configuration.

DESCRIPTION OF THE PREFERRED EMBODIMENT

It should be noted at the outset of this description that, while the magnetic transducer is described herein and illustrated in the drawings as a speed sensor for use in monitoring the speed of the wheels of a vehicle axle assembly, the transducer can be utilized in other speed sensing applications, or in other applications wherein it is desired to sense movement of a ferrous object.

Referring to the drawings, there is shown in FIGS. 1 and 2 a speed sensor 10 which is mounted on a vehicle axle assembly 12 for monitoring the speed of a pair of wheel units 13 and 14. The vehicle axle assembly 12 includes a center differential unit 15 having tubular axle housings 16 and 17 extending therefrom for rotatably supporting the wheel units 13 and 14. The differential unit 15 includes an input yoke 18 which is adapted to be connected to a vehicle drive shaft (not shown) in a conventional manner. Internally, the differential includes a pinion gear (not shown) which is driven by the input yoke 18 and is connected to drive an associated ring gear (not shown).

As shown in FIG. 2, the differential unit 15 includes an outer housing 19 to which the speed sensor 10 is secured. Referring to FIG. 3, the speed sensor 10 includes a cylindrical body portion 21 having an annular groove formed therein for receiving an O-ring 22. A retaining bracket 23 is secured relative to the cylindrical body portion 21 and is provided with a mounting hole 24 on one side thereof and a rectangular notch 25 on the opposite side. The cylindrical body 21 is adapted to be inserted into a cooperating aperture 19a formed in the differential housing 19 and the O-ring 22 sealingly engages the inner wall of the aperture to prevent any leakage of lubricating oil contained within the housing. The speed sensor is secured relative to the outer housing 19 by means of a bolt 26 which extends through the aperture 24 and into a cooperating threaded bore formed in the housing.

The speed sensor 10 further includes a right angle body portion 28 formed integral with the cylindrical body portion 21 and which houses a pair of connecting pins 29a and 29b and an elastomeric sealing sleeve 30. A connecting cable 31 (shown in FIG. 2) having a cooperating plug member is inserted into the elastomeric sleeve 31 for connection thereto. The cable can be connected to an associated electronic control circuit, such as an anti-lock brake control circuit, a transmission circuit, or a cruise control circuit.

The outer end of the cylindrical body portion 21 defines a planar surface 21a generally perpendicular to a longitudinal axis A of the body portion 21. A pole piece 33 extends perpendicularly outwardly from the surface 21a along the axis A. In the preferred embodiment of the invention, the pole piece 33 has an outer end 33a which defines a generally rectangular cross-section.

The pole piece 33 is preferably adapted to sense the rotation of a separate exciter ring 34 (shown in FIG. 2) which is mounted within the differential casing 19 and is secured for rotation with the ring gear of the differential assembly. The exciter ring 34 is provided with a plurality of circumferentially spaced apart projecting teeth 34a about the periphery thereof. The spacing between the outer tip portion of the teeth 34a and the inner end surface of the pole piece 33a is selected such that the speed sensor generates an output signal of a sufficient magnitude to the associated control circuit. As will be discussed, the speed sensor of the present invention has a pole piece construction which tends to maximize the output of the speed sensor, thus allowing for larger air gap distances between the pole piece 33a and the exciter teeth 34a than was possible with prior art speed sensors. It will be appreciated that, while the speed sensor 10 of the present invention has been found to be especially effective with an exciter ring having a construction as hereinafter described, the speed sensor need not be used with the particular exciter ring as described herein. For example, the speed sensor can be positioned such that its pole piece is adjacent the periphery of the teeth of the associated rotating ring gear.

Referring now to FIGS. 4 and 5, the internal components of the speed sensor and the specific construction of the pole piece 33 will now be discussed in detail. As shown in FIG. 3, a cylindrical-shaped permanent magnet 32 is coaxially positioned within the body portion 21. The pole piece 33 includes an enlarged cylindrical inner end portion 33b and extends axially outwardly past the end face 21a of the body portion 21. A plastic insulating bobbin 35 surrounds the magnet and most of the pole piece 33. The insulating bobbin 35 defines an annular space for supporting a coil 36 in coaxial relationship about an intermediate portion 33c of the pole piece 33. The insulating bobbin 35 includes a projecting portion 35a extending upwardly from the magnet as viewed in FIG. 3 for supporting the connecting pins 29a and 29b (only pin 29a is shown in FIG. 3). The coil 36 can be connected to the connecting leads 29a and 29b by lead wires 37 which run along the outer surface of the insulating bobbin.

In assembling the speed sensor, the magnet 32 and the pole piece 33 are positioned adjacent one another, and are inserted in a mold cavity (not shown) in spaced apart relationship with the pair of parallel connecting pins 29a and 29b. A notch 33d is provided on the enlarged cylindrical portion 33a of the pole piece to enable the pole piece to be properly oriented within the mold cavity. After the insulating bobbin 35 has been integrally molded about the magnet 32, the pole piece 33, and the connecting pins 29a and 29b, the coil 36 can be wound and then connected to the connecting pins by the connecting wires 37. Next, the bobbin sub-assembly can then be placed within a second mold cavity for integrally molding the cylindrical body portion 21 and the right angle portion 28 about the subassembly. At the same time, the retainer plate 23 is provided with an enlarged aperture 23a for receiving the subassembly, and the notch 25 formed therein is used to maintain the plate 23 in a predetermined rotative relationship with the bobbin assembly when in the second mold cavity.

As previously mentioned, the pole piece 33 is constructed of a unique configuration. As shown in FIGS. 4 and 6, the end of the pole piece 33 adjacent the magnet 32 includes the enlarged cylindrical portion 33b formed of a diameter D1 equal to the diameter of the cylindrical magnet 32. The inner end 33b is connected to the intermediate cylindrical portion 33c formed of a diameter D2 equal to the diameter of the aperture through the insulating bobbin 35. The outer end 33a of the pole piece 33 has a rectangular configuration defined by dimensions W1 and W2. In the preferred embodiment of the invention, W2 is greater than W1. The intermediate portion 33c is connected to the rectangular outer end 33a by means of a conical transition section 33e. As shown in FIG. 4, the conical section begins at a point generally centrally located within the coil 36 and, as shown in FIG. 6, terminates along the longer side of the rectangular tip portion at a point 33f just slightly spaced from the outer edge of the rectangular tip. It has been found that the above described pole piece configuration maximizes the output of the speed sensor.

The exciter ring is also provided with a unique configuration. As shown in FIG. 4, the individual exciter teeth 34a each are provided with a semi-cylindrical tip portion 34b, and parallel sidewall portions 34c and 34d. Adjacent teeth 34a are connected by a semi-cylindrical portion 34e. As shown in FIG. 4, the diameter of the cylindrical portion 34a and the spacing between the parallel sidewalls 34c and 34d has a dimension D, while the spacing between adjacent exciter teeth 34a and the diameter of the lower cylindrical portion 34e has a dimension S. The height of the exciter teeth is shown as dimension H, while the width of the teeth is shown in FIG. 5 as dimension L.

In the preferred embodiment of the invention, the dimension W1 of the rectangular end portion 33a is approximately equal to the dimension D, which represents the diameter of the semi-cylindrical portion 34b and spacing between the parallel side walls 34c and 34d. Also, the dimension W2, which is typically greater than W1, is selected to be slightly less than the dimension L, shown in FIG. 5. Preferably, the spacing S between adjacent exciter teeth is selected to be slightly greater than the dimension D. The height H of each exciter tooth should be at least as great as the spacing S. While the pole piece configuration of FIG. 6 has been found to be especially effective when utilized with the exciter ring of FIGS. 4 and 5, it will be appreciated that the present invention is not limited to a pole piece having the exact configuration as shown in FIG. 6. For example, the conical portions on the shorter sides of the rectangular outer end 33a could also extend downwardly and be slightly spaced from the outer edges of the rectangular tip in a manner similar to the conical portions which terminate at the point 33f.

The pole piece configuration of FIG. 6 has been found to provide increased output and improved low speed signal wave forms as compared with the prior art embodiments of FIGS. 7 and 8. There is shown in FIG. 7 a prior art version of a pole piece 40. In particular, the pole piece 40 includes an upper cylindrical portion 40a having a diameter corresponding to the diameter of the cylindrical magnet, an intermediate cylindrical portion 40b having a diameter corresponding to the inner diameter of the central aperture in the insulating bobbin, and an outer cylindrical tip portion 40c having a diameter smaller than the diameter of the intermediate portion. A conical transition section 40d is provided for connecting the intermediate portion 40b and the outer tip portion 40c.

There is shown in FIG. 8 a second prior art embodiment of a pole piece 50. The pole piece 50 includes an upper cylindrical portion 50a, and a lower "chisel-shaped" outer tip portion 50b. The tip portion 50b is typically position in parallel relationship with the long dimension of the associated gear teeth.

In summary, the present invention is concerned with a pole piece having an inner end provided with cross-sectional configuration corresponding to the cross-sectional configuration of the one end of the permanent magnet, an intermediate portion having a cross-sectional configuration which is maximized relative to the surrounding coil, and a rectangular-shaped outer tip portion which is sized in accordance with the particular configuration of the ferrous object to be sensed.

It will be appreciated that various modifications may be made to the speed sensor and exciter ring shown and described without departing from the spirit and scope of the invention as set forth in the following claims.

What is claimed is:

1. A magnetic transducer comprising:
   a magnet; adjacent ends of said rectangular outer end portion and said conical transition portion are coextensive with one another along a predetermined axial length of said body portion.

2. A transducer as defined in claim 1 wherein said transition portion extends from a point located within said coil means to a point adjacent an outer end surface of said outer end portion.

3. A pole piece for use in a variable reluctance transducer comprising:
   an elongate main body portion defining an axis and constructed of a ferrous material, said body portion including a cylindrical inner end portion, a cylindrical intermediate portion, a transition portion, and an outer end portion;
   said cylindrical inner end portion defining a first outer diameter;
   said cylindrical intermediate portion having one end connected to said cylindrical inner end portion and defining a second outer diameter smaller than said first diameter;
   said transition portion being conically shaped and connecting the opposite end of said intermediate portion to said outer end portion; and
   said outer end portion defining a rectangular cross-sectional configuration extending the entire length thereof, and wherein the adjacent ends of said rectangular outer end portion and said conical transition portion are coextensive with one another along a predetermined axial length of said body portion.

4. A pole piece as defined in claim 3 wherein said transition portion terminates adjacent an outer end surface of said outer end portion.

5. A pole piece as defined in claim 3 wherein said rectangular outer end portion extends axially inwardly and cooperates with said conical transition portion to in part define the outer shape of said pole piece until a diameter at an inner point of said conical transition portion becomes greater than a diagonal defined by said rectangular outer end portion, and wherein said conical transition portion extends axially outwardly and cooperates with said rectangular outer end portion to in part define the outer shape of the pole piece until the diameter at an outer point of said conical transition portion becomes less than the width of said rectangular outer end portion.

6. An apparatus for sensing the speed of a rotating object having a rotational axis comprising:
an exciter ring secured relative to the object for rotation therewith in a plane perpendicular to the rotational axis of the object, said exciter ring having a plurality of uniformly and circumferentially spaced teeth thereon, said teeth constructed of a ferrous material;
a sensor positioned adjacent said exciter ring for sensing said teeth as they pass by said sensor;
said sensor including magnet means, an elongate pole piece having an inner end positioned adjacent said magnet means and an opposite outer end positioned in spaced relationship from said teeth; and coil means insulated from and surrounding said pole piece for sensing changes in reluctance of a magnetic circuit extending through said pole piece;
said teeth each including a generally semi-cylindrical tip portion having an axis substantially parallel to the rotating axis, each of said teeth having a pair of generally parallel side walls spaced apart by a predetermined width and parallel to the rotating axis; and
said outer end of said pole piece spaced radially outward from said semi-cylindrical tip portion and having a generally rectangular cross section and defining a rectangular surface in facing relationship to said semi-cylindrical tip portion, said rectangular surface defining first and second parallel edges parallel to said cylindrical axis, and third and fourth spaced apart parallel edges perpendicular to said cylindrical axis.

7. An apparatus as defined in claim 6 wherein said pole piece includes an inner end and an intermediate portion, said inner end positioned adjacent said magnet and having a cross-sectional configuration generally corresponding to a cross-sectional configuration of said one end of said magnet, and said intermediate portion having a cross-sectional configuration corresponding to a cross-section configuration of an aperture defined by said coil means.

8. An apparatus as defined in claim 7 wherein said inner end of said pole piece is cylindrical and defines a first diameter, and said intermediate portion is cylindrical and defines a second diameter less than said first diameter.

9. An apparatus as defined in claim 8 including a conical-shaped transition section connecting said intermediate portion and said rectangular outer end.

10. An apparatus as defined in claim 9 wherein said transition section extends from a point located within said coil means to a point adjacent said rectangular surface.

11. An apparatus as defined in claim 6 wherein said semi-cylindrical tip portion is formed of a predetermined diameter and defines a predetermined axial length.

12. An apparatus as defined in claim 6 wherein said third and fourth edges have a length generally corresponding to said predetermined diameter of said semi-cylindrical top portion.

13. An apparatus as defined in claim 12 wherein said first and second edges have a length less than said predetermined axial length.

14. An apparatus as defined in claim 13 wherein said first and second edges are longer than said third and fourth edges.

15. An apparatus as defined in claim 6 wherein said side walls of adjacent teeth are connected by a semi-cylindrical lower portion.

16. An exciter ring for use in a system for sensing the speed of a rotating object having a rotational axis wherein a magnetic transducer is mounted adjacent said exciter ring for producing an electrical signal representing the speed of the rotating object, said exciter ring comprising:
means for securing said exciter ring relative to the object for rotation therewith;
a plurality of uniformly and circumferentially spaced teeth positioned thereon, said teeth constructed of a ferrous material;
said teeth each including a generally cylindrical tip portion formed of a predetermined diameter having an axis substantially parallel to the rotating axis and a pair of parallel side walls extending radially inward from said tip portion and spaced apart by said predetermined diameter.

17. An exciter ring according to claim 16, wherein said side walls of adjacent teeth are connected by a semi-cylindrical lower portion.

* * * * *